W. B. CLAFLIN.
METALLIC PACKING.
APPLICATION FILED MAY 14, 1908. RENEWED FEB. 1, 1910.
965,688.
Patented July 26, 1910.
3 SHEETS—SHEET 1.
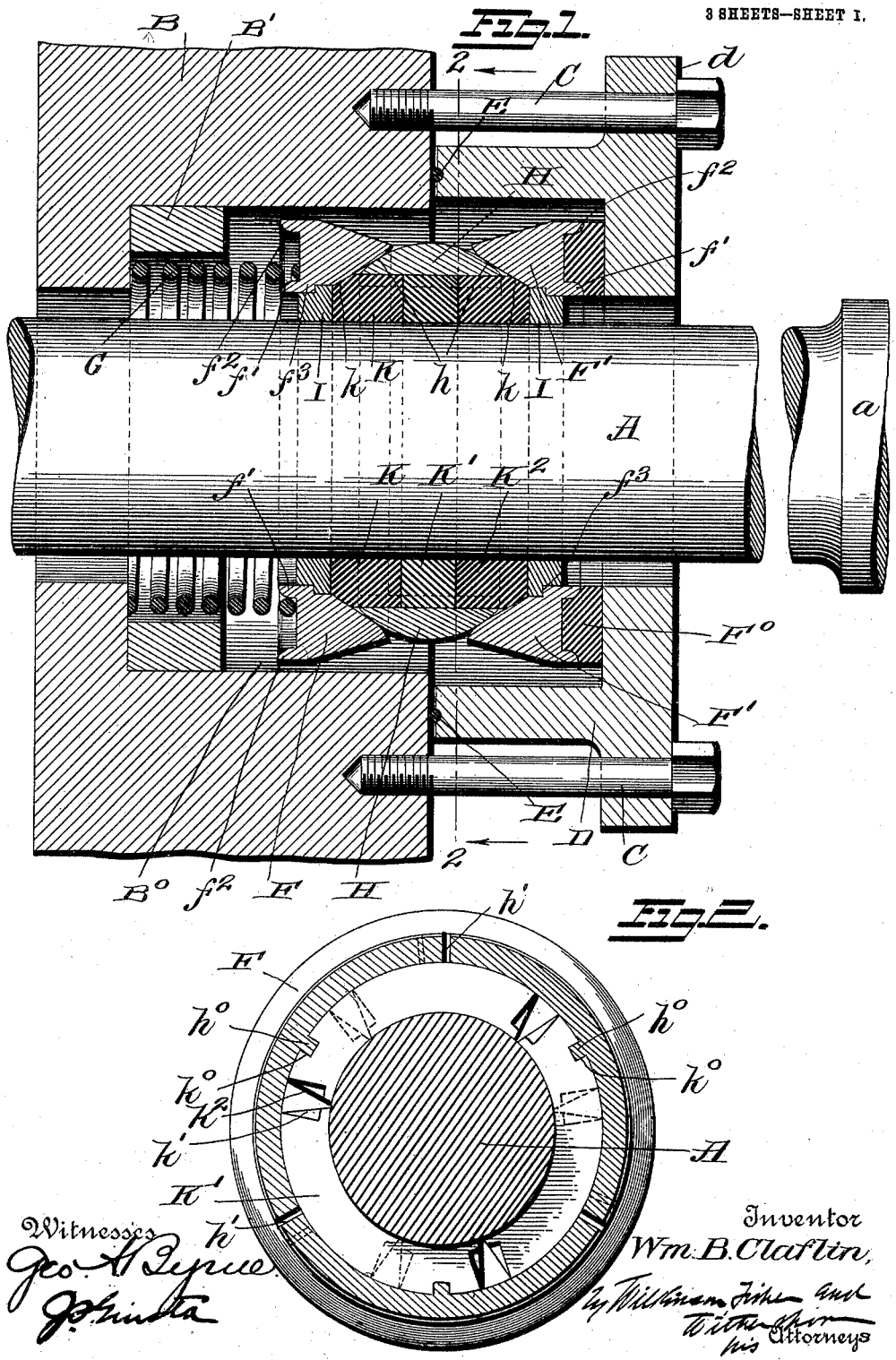

W. B. CLAFLIN.
METALLIC PACKING.
APPLICATION FILED MAY 14, 1908. RENEWED FEB. 1, 1910.
965,688.
Patented July 26, 1910.
3 SHEETS—SHEET 2.
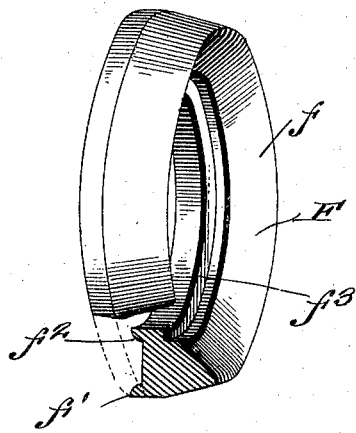
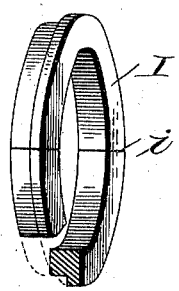
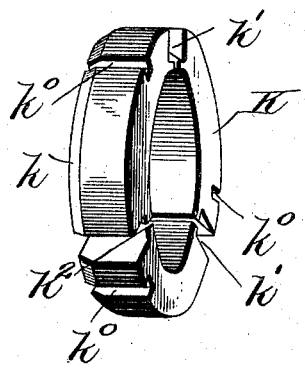
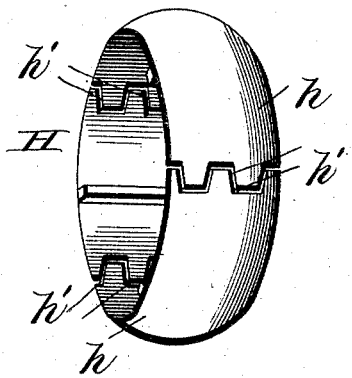
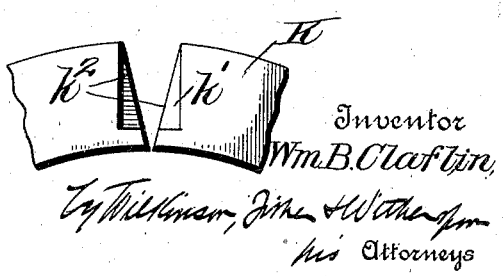

W. B. CLAFLIN.
METALLIC PACKING.
APPLICATION FILED MAY 14, 1908. RENEWED FEB. 1, 1910.
965,688.
Patented July 26, 1910.
3 SHEETS—SHEET 3.
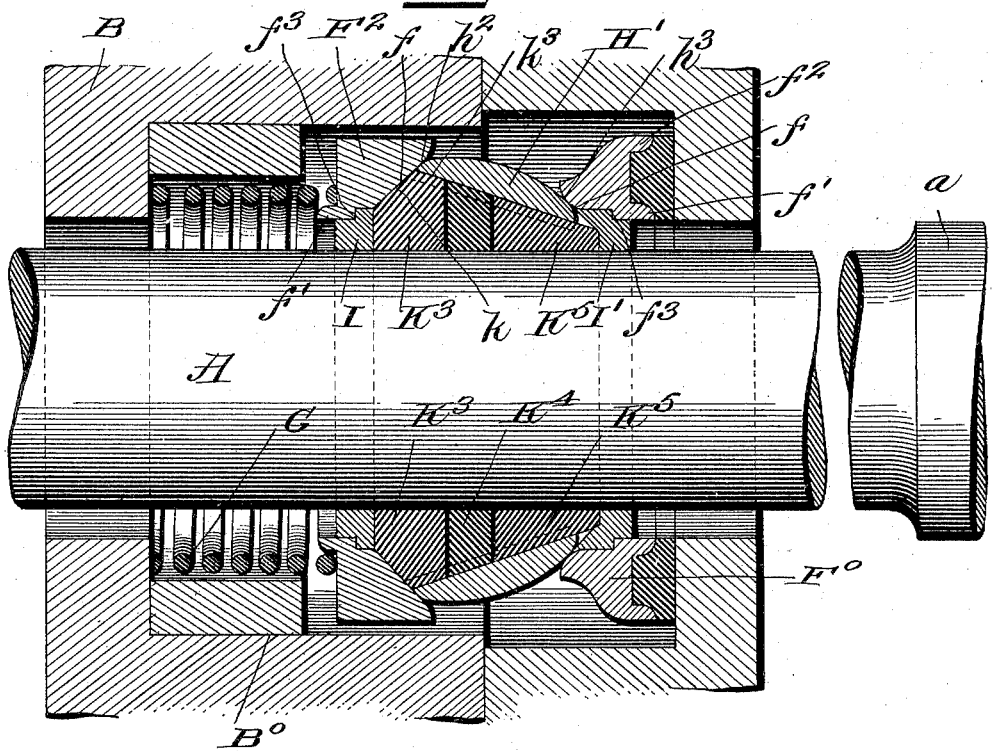
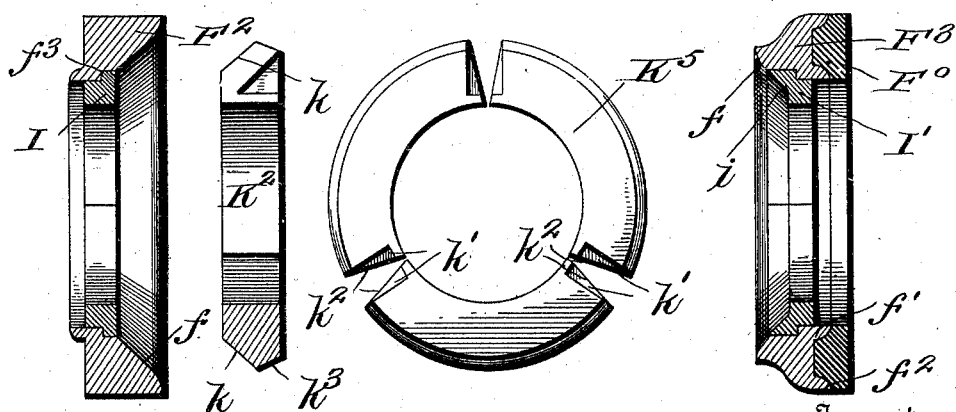

UNITED STATES PATENT OFFICE.

WILLIAM B. CLAFLIN, OF NEW YORK, N. Y.

METALLIC PACKING.

965,688.  Specification of Letters Patent.  Patented July 26, 1910.

Application filed May 14, 1908, Serial No. 432,912. Renewed February 1, 1910. Serial No. 541,354.

*To all whom it may concern:*

Be it known that I, WILLIAM B. CLAFLIN, a citizen of the United States, residing at New York, in the county of New York and State of New York, have invented certain new and useful Improvements in Metallic Packing; and I do hereby declare the following to be a full, clear, and exact description of the invention, such as will enable others skilled in the art to which it appertains to make and use the same.

My invention relates to improvements in metallic packing for rods, and it is intended to provide a suitable self adjusting packing capable of retaining fluid pressure, and of permitting a longitudinal motion of the rod, as also the usual inevitable lateral vibrations of said rod.

My invention is especially adapted for use with piston rods of cylinders, but it may be used in connection with turbine shafts, valve stems, or other rods or shafts requiring similar packing.

My invention will be understood by reference to the accompanying drawings in which—

Figure 1 shows a section through the gland and packing, the piston rod being shown in elevation. This form of packing is especially adapted for comparatively low fluid pressure. Fig. 2 shows a section through the packing along the line 2—2 of Fig. 1, and looking in the direction of the arrows, the parts being on a larger scale.
Fig. 3 is a perspective view of one of the solid retaining rings, parts being broken away. Fig. 4 is a perspective view of one of the segmental filling rings held in a corresponding retaining ring. Fig. 5 is a perspective view of one of the segmental soft metal packing rings. Fig. 6 shows a segmental bearing ring which incloses a series of segmental packing rings. Fig. 7 is a detail showing a portion of one of the packing rings before it is divided into segments. Fig. 8 is a similar view after this ring has been divided. Fig. 9 shows a form of the packing especially intended for high fluid pressures, the section being similar to that shown in Fig. 1. Fig. 10 shows one of the retaining rings and the segmental filling ring. Fig. 11 shows a section of the packing ring adjacent to the retaining ring shown in Fig. 10. Fig. 12 is an end view of one segmental packing ring shown in Fig. 9, as seen from the left and Fig. 13 is a section of the opposite retaining ring together with its base packing ring.

Referring first to Figs. 1 to 8, A represents the rod or shaft to be packed. A usual form of piston rod is shown having the upset portion or cross head $a$.

B represents the cylinder head with the cylindrical recess B° and the bushing B. The gland D is attached to the cylinder head in any convenient way, as by stud bolts C passing through the flange $d$ of the gland.

E represents a gasket, preferably of soft copper, between the gland and the cylinder head.

F and $F^1$ are two oppositely disposed retaining rings made large enough in inner diameter to slip over the cross-head $a$, inside of these retaining rings and held by an annular shoulder are the segmental inner or lining rings I, made of bronze or brass. The retaining ring F is pressed forward by the coil spring G, whose outer end engages in an annular groove between the ribs $f^1$ and $f^2$. The opposite retaining ring $F^1$ is provided with a base packing ring F°, preferably of hard Babbitt metal, abutting against the inner face of the gland and projecting between the ribs $f^1$ and $f^2$. This base ring F° is free to slide over the inner face of the gland, forming a valve whose seat is automatically ground as the rod moves laterally, thus preventing the escape of the fluid or gas between the base ring F° and the gland. Thus the retaining ring $F^1$, as also the ring F, are free to move laterally with the rod or shaft as the said shaft vibrates laterally. The two retaining rings F and $F^1$ have their inner faces $f$ in the form of reversed truncated cones to bear against the wedging faces $h$ of the segmental bearing ring H, which is composed of a plurality of segments connected together so as to expand or contract, as by means of the engaging lugs $h^1$ shown in Fig. 6. The inner surface of this segmental bearing ring H is made cylindrical to engage the outer faces of the packing rings K, $K^1$, and $K^2$, made of suitable packing metal, such as soft Babbitt metal. There may be any desired number of these packing rings, but preferably two or more. These packing rings are normally pressed together axially by the lining rings I, which are pressed upon at all times by the spring G; and when the fluid pressure is on, this also tends to press the rings together axially. The packing rings are pressed inward toward the shaft or rod, mainly by the fluid pressure acting upon the segmental bearing ring H, but also by the wedging effect of the cone faces $f$ on the wedge faces $h$. Of course, if while the rod is moving, the fluid pressure falls, or is cut off altogether, the axial pressure on the packing rings is greatly reduced, with consequent reduction of friction and wear.

In order to compensate for wear on the interior, the packing rings are made in a plurality of segments, preferably three or more to each ring, which segments are held slightly spaced apart by means of suitable ribs and grooves such as the rib $h°$ on the bearing ring H, and the groove $k°$ on the packing ring. So that the segments may be free to move inward when wear takes place, V shaped slots are provided which are preferably cut through recessed portions $k^1$ of the packing rings as shown in Figs. 2, 7 and 8. This crushing strain on the packing rings causes the thin contacting edges of the segments to wear away along the V shaped slots, insuring sufficient mobility inward and yet a substantially tight joint where the segments abut. By having these V shaped slots staggered in the several rings, and out of alinement with the breaks in the inclosing bearing rings, greater tightness in the packing is secured.

For convenience of manufacture, each ring is preferably cast as a unit, with recesses $k^1$ as shown in Fig. 7 and then it is cut along the lines $k^2$ to form a V shaped slot with a slight opening in the inner end of the slot. It will be seen that by this arrangement a portion of the pressure of the spring G, and more important still, the fluid pressure of the cylinder will exert a pressure tending to compress each unit of cylindrical area of each packing ring inwardly with substantially the same force. This force, while constant as to the action of the spring, varies widely as the fluid pressure in the cylinder varies; but whatever this pressure may be, its effect is substantially the same on all the packing rings, being substantially no greater for one than for another, and thus the rings wear evenly in use.

Where high fluid pressures are to be taken care of, the form of device shown in Figs. 9 to 13 might be preferable. The construction here is generally the same as in the device shown in Figs. 1 to 8, except that the segmental bearing ring $H^1$ is set at an angle to its axis, having its interior face in the form of a frustum of a cone, and bearing against similar faces $k^3$ on the tapered rings $K^3$, $K^4$ and $K^5$. Furthermore the surfaces $f$ of the ring $F^2$, $k$ of the packing ring $K^3$ and $h^2$ of the bearing ring $H^1$, are at a less acute angle to the axis of the rod A and therefore have less inward wedging effect, and more longitudinally pressing effect than before, tending to press outward axially, rather than inward radially, while this longitudinal pressure causes the wedging face $h^3$ of the ring $H^1$ to wedge under the inclined face $f$ of the ring $F^3$ and the inclined face $i$ of the segmental lining ring $I^1$. This will cause the outer packing ring $K^5$ to bind more on the rod A than the others, and will therefore cause the packing to be tighter toward the outer or open end of the gland.

It will be seen that both forms of device provide a packing which fits loosely in the gland, and in which the pressure of the fluid, supplemented by the spring G, causes a base packing ring $F°$ to bear hard against the inner face of the gland, forming a valve whose seat is automatically ground tight by the lateral vibrations of the rod A, thus preventing the escape of the fluid between the base packing ring and the gland. It will also be seen that the packing rings engaging the rod or shaft A are also automatically ground to fit snugly on the part to be packed. It will also be noted that the gland may be removed and that all the parts of the packing, whether contained in the gland or in the recess $B°$ in the cylinder head, may be readily removed, and that a new gland and its contents may be applied without affecting the cylinder or piston rod. It will also be evident that the herein described packing may be readily applied to cylinders, pistons, valve stems, shafts &c. as ordinarily constructed, without necessitating any substantial or expensive alterations in existing parts. By having lubricating material, such as graphite or oil, or both, placed in the recessed ends and V shaped slots of the packing rings, the bearing becomes self lubricating.

It will be obvious that various modifications might be made in the herein described apparatus, and in the construction, combination and arrangement of parts, which might be used without departing from the spirit of my invention.

Having thus described my invention, what I claim and desire to secure by Letters Patent of the United States is:—

1. A metallic packing for rods or shafts comprising a plurality of segmental packing rings surrounding the rod or shaft, a segmental bearing ring inclosing said packing rings, the segments of said packing rings and said bearing ring being connected together by axially disposed ribs and grooves, retaining rings mounted exterior to said bearing ring and engaging same, and also respectively engaging the end rings of said plurality of packing rings, and a spring normally pressing on one of said retaining rings, substantially as described.

2. A metallic packing for rods or shafts comprising a plurality of segmental packing rings surrounding the rod or shaft, a segmental bearing ring inclosing said packing rings, the segments of said packing rings and said bearing ring being connected together by axially disposed ribs and grooves, retaining rings mounted exterior to said bearing ring and engaging same, and also respectively engaging the end rings of said plurality of packing rings, and a coil spring engaging in an annular groove in and normally pressing on one of said retaining rings, substantially as described.

3. A metallic packing for rods or shafts comprising a plurality of segmental packing rings surrounding the rod or shaft, a segmental bearing ring inclosing said packing rings, the segments of said packing rings and said bearing ring being connected together by axially disposed ribs and grooves, and the segments of said packing rings having their abutting ends recessed and separated by V shaped slots, retaining rings mounted exterior to said bearing ring and engaging same, and also respectively engaging the end rings of said plurality of packing rings, and a spring normally pressing on one of said retaining rings, substantially as described.

4. A metallic packing for rods or shafts comprising a plurality of segmental packing rings surrounding the rod or shaft, a segmental bearing ring inclosing said packing rings, the segments of said packing rings and said bearing ring being connected together by axially disposed ribs and grooves, and the segments of said packing rings having their abutting ends recessed and separated by V shaped slots, retaining rings mounted exterior to said bearing ring and engaging same, and also respectively engaging the end rings of said plurality of packing rings, and a coil spring engaging in an annular groove in and normally pressing on one of said retaining rings, substantially as described.

5. A metallic packing for rods or shafts comprising a plurality of segmental packing rings surrounding the rod or shaft, a segmental bearing ring inclosing said packing rings, the segments of said packing rings and said bearing ring being connected together by axially disposed ribs and grooves, and the said segments of said packing rings having their abutting ends separated by V shaped slots, staggered as to the several packing rings of the group, and screened by the segments of the bearing ring, retaining rings mounted exterior to said bearing ring and engaging same, and also respectively engaging the end rings of said plurality of packing rings, and a spring normally pressing on one of said retaining rings, substantially as described.

6. A metallic packing for rods or shafts comprising a plurality of segmental packing rings surrounding the rod or shaft, a segmental bearing ring inclosing said packing rings, the segments of said packing rings and said bearing ring being connected together by axially disposed ribs and grooves, and the said segments of said packing rings having their abutting ends separated by V shaped slots, staggered as to the several packing rings of the group, and screened by the segments of the bearing ring, retaining rings mounted exterior to said bearing ring and engaging same, and also respectively engaging the end rings of said plurality of packing rings, and a coil spring engaging in an annular groove in and normally pressing on one of said retaining rings, substantially as described.

7. A metallic packing for rods or shafts comprising a gland secured to the vessel containing the fluid pressure, and free from contact with said rod or shaft, a series of segmental packing rings mounted upon said rod or shaft, a segmental bearing ring inclosing said packing rings, and provided with wedge faces on its exterior, a spring impressed retaining ring having a hollow conical wedging face engaging one end of said bearing ring, a similar retaining ring reversely disposed and engaging the other end of said bearing ring, and a base packing ring packing the space between said second retaining ring and the inner face of said gland, and free from contact with said rod or shaft, substantially as described.

8. A metallic packing for rods or shafts comprising a gland secured to the vessel containing the fluid pressure, and free from contact with said rod or shaft, a series of segmental packing rings mounted upon said rod or shaft, a segmental bearing ring inclosing said packing rings, and provided with wedge faces on its exterior, a spring impressed retaining ring having a hollow conical wedging face engaging one end of said bearing ring, a similar retaining ring reversely disposed and engaging the other end of said bearing ring, segmental lining rings held between said retaining rings and said rod or shaft and bearing against the opposite end of said series of packing rings, and a base packing ring packing the space between said second retaining ring and the inner face of said gland, and free from contact with said rod or shaft, substantially as described.

9. A metallic packing for rods or shafts comprising a gland secured to the vessel containing the fluid pressure and free from contact with said rod or shaft, a series of segmental packing rings mounted upon said rod or shaft, a segmental bearing ring inclosing said packing rings, and provided with wedge faces on its exterior, the segments of said packing ring and said bearing ring being locked together by axial ribs and grooves, and the abutting ends of the segments of the packing rings being separated by V shaped slots, said slots being staggered as to the several packing rings, and screened by the segments of the bearing ring, a spring impressed retaining ring having a hollow conical wedging face engaging one end of said bearing ring, a similar retaining ring reversely disposed and engaging the other end of said bearing ring, and a base packing ring packing the space between said second retaining ring and the inner face of said gland, and free from contact with said rod or shaft, substantially as described.

10. A metallic packing for rods or shafts comprising a gland secured to the vessel containing the fluid pressure, and free from contact with said rod or shaft, a series of segmental packing rings mounted upon said rod or shaft, a segmental bearing ring inclosing said packing rings, and provided with wedge faces on its exterior, the segments of said packing ring and said bearing ring being locked together by axial ribs and grooves, and the abutting ends of the segments of the packing rings being separated by V shaped slots, said slots being staggered as to the several packing rings, and screened by the segments of the bearing ring, a spring impressed retaining ring having a hollow conical wedging face engaging one end of said bearing ring, a similar retaining ring reversely disposed and engaging the other end of said bearing ring, segmental lining rings held between said retaining rings and said rod or shaft and bearing against the opposite ends of said series of packing rings, and a base packing ring packing the space between said second retaining ring and the inner face of said gland, and free from contact with said rod or shaft, substantially as described.

11. A metallic packing for rods or shafts comprising a gland secured to the vessel containing the fluid pressure, and free from contact with said rod or shaft, a series of tapered segmental packing rings mounted upon said rod or shaft, a segmental bearing ring having its inner surface in the form of a hollow cone inclosing said packing rings, and provided with wedge faces on its exterior, a spring impressed retaining ring having a hollow conical wedging face engaging one end of said bearing ring, a similar retaining ring reversely disposed and engaging the other end of said bearing ring but at a more acute angle than the first, and a base packing ring packing the space between said second retaining ring and the inner face of said gland, and free from contact with said rod or shaft, substantially as described.

12. A metallic packing for rods or shafts comprising a gland secured to the vessel containing the fluid pressure, and free from contact with said rod or shaft, a series of tapered segmental packing rings mounted upon said rod or shaft, a segmental bearing ring having its inner surface in the form of the frustum of a hollow cone, inclosing said packing rings, and provided with wedge faces on its exterior, a spring impressed retaining ring having a hollow conical wedging face engaging one end of said bearing ring, a similar retaining ring reversely disposed and engaging the other end of said bearing ring but at a more acute angle than the first, segmental lining rings held between said retaining rings and said rod or shaft and bearing against the opposite ends of said series of packing rings, and a base packing ring packing the space between said second retaining ring and the inner face of said gland, and free from contact with said rod or shaft, substantially as described.

13. A metallic packing for rods or shafts comprising a gland secured to the vessel containing the fluid pressure, and free from contact with said rod or shaft, a series of tapered segmental packing rings mounted upon said rod or shaft, a segmental bearing ring having its inner surface in the form of the frustum of a hollow cone inclosing said packing rings, and provided with wedge faces on its exterior, the segments of said packing ring and said bearing ring being locked together by axial ribs and grooves, and the abutting ends of the segments of the packing rings being separated by V shaped slots, said slots being staggered as to the several packing rings, and screened by the segments of the bearing ring, a spring impressed retaining ring having a hollow conical wedging face engaging one end of said bearing ring, a similar retaining ring reversely disposed and engaging the other end of said bearing ring, but at a more acute angle than the first, and a base packing ring packing the space between said second retaining ring and the inner face of said gland, and free from contact with said rod or shaft, substantially as described.

14. A metallic packing for rods or shafts comprising a gland secured to the vessel containing the fluid pressure, and free from contact with said rod or shaft, a series of tapered segmental packing rings mounted upon said rod or shaft, a segmental bearing ring having its inner surface in the form of the frustum of a hollow cone, inclosing said packing rings, and provided with wedge faces on its exterior, the segments of said packing rings and said bearing ring being locked together by axial ribs and grooves, and the abutting ends of the segments of the packing rings being separated by V shaped slots, said slots being staggered as to the several packing rings, and screened by the segments of the bearing ring, a spring impressed retaining ring having a hollow conical wedging face engaging one end of said bearing ring, a similar retaining ring reversely disposed and engaging the other end of said bearing ring, but at a more acute angle than the first, segmental lining rings held between said retaining rings and said rod or shaft and bearing against the opposite ends of said series of packing rings, and a base packing ring packing the space between said second retaining ring and the inner face of said gland, and free from contact with said rod or shaft, substantially as described.

In testimony whereof, I affix my signature, in presence of two witnesses.

WILLIAM B. CLAFLIN.

Witnesses:
MOSES ELY,
JOSEPH S. HUNT.